United States Patent
Pan et al.

(10) Patent No.: US 12,492,139 B2
(45) Date of Patent: Dec. 9, 2025

(54) PROCESS FOR ENRICHING PHOSPHORUS AND RECOVERING BLUE IRON ORE BY USING BIOFILM METHOD

(71) Applicant: SUZHOU UNIVERSITY OF SCIENCE AND TECHNOLOGY, Jiangsu (CN)

(72) Inventors: Yang Pan, Jiangsu (CN); Xingyu Zhang, Jiangsu (CN); Yong Hang, Jiangsu (CN); Min Ni, Jiangsu (CN); Yue Chen, Jiangsu (CN)

(73) Assignee: SUZHOU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 421 days.

(21) Appl. No.: 18/005,971

(22) PCT Filed: May 24, 2021

(86) PCT No.: PCT/CN2021/095397
§ 371 (c)(1),
(2) Date: Jan. 19, 2023

(87) PCT Pub. No.: WO2022/110695
PCT Pub. Date: Jun. 2, 2022

(65) Prior Publication Data
US 2023/0271864 A1    Aug. 31, 2023

(30) Foreign Application Priority Data

Nov. 30, 2020    (CN) .......................... 202011377569.1

(51) Int. Cl.
C02F 3/30    (2023.01)
B01D 9/00    (2006.01)
(Continued)

(52) U.S. Cl.
CPC ............ *C02F 3/308* (2013.01); *B01D 9/0036* (2013.01); *B01D 9/0059* (2013.01);
(Continued)

(58) Field of Classification Search
CPC ........ C02F 3/308; C02F 3/006; C02F 1/5245; C02F 3/04; C02F 3/1263; C02F 3/1268;
(Continued)

(56) References Cited

FOREIGN PATENT DOCUMENTS

| CN | 104445555 A | * | 3/2015 | ............ C02F 1/5245 |
| CN | 106745740 A | * | 5/2017 | ................ C02F 3/30 |

(Continued)

OTHER PUBLICATIONS

Machine-generated English translation of CN 104445555, generated on May 13, 2025.*

(Continued)

*Primary Examiner* — Fred Prince
(74) *Attorney, Agent, or Firm* — Bayramoglu Law Offices LLC

(57) ABSTRACT

A process for enriching phosphorus and recovering vivianite by a biofilm method includes the following steps: 1) an aerobic phosphorus absorption stage; 2) an anaerobic phosphorus release stage; 3) a cyclic enrichment stage; 4) a seed crystal forming stage; and 5) a crystal forming stage. Phosphorus is enriched by the biofilm method and recovered with vivianite as a recovery product, which solves the problem of phosphorus removal from municipal sewage and improves the economic value; by preparing high dissolved oxygen at the aerobic stage, a high-concentration phosphorus recovery solution can be obtained with a relatively low carbon-phosphorus ratio and relatively high enrichment times, and the consumption of carbon sources can be reduced; since the oxidation-reduction potential is controlled to be less than –100 mv by the biofilm method at the anaerobic phosphorus (Continued)

release stage, the oxidation-reduction potential does not need to be adjusted again during the recovery of vivianite.

10 Claims, 2 Drawing Sheets

(51) Int. Cl.
*C01B 25/37* (2006.01)
*C02F 1/52* (2023.01)
*C02F 3/00* (2023.01)
*C02F 3/04* (2023.01)
*C02F 3/12* (2023.01)
*C02F 3/28* (2023.01)

(52) U.S. Cl.
CPC ............ *C01B 25/375* (2013.01); *C02F 3/006* (2013.01); *C02F 2001/5218* (2013.01); *C02F 1/5245* (2013.01); *C02F 3/04* (2013.01); *C02F 3/1263* (2013.01); *C02F 3/1268* (2013.01); *C02F 3/282* (2013.01); *C02F 2209/04* (2013.01); *C02F 2209/22* (2013.01); *C02F 2209/44* (2013.01); *C02F 2305/06* (2013.01); *Y02W 10/10* (2015.05)

(58) Field of Classification Search
CPC .............. C02F 3/282; C02F 2001/5218; C02F 2209/04; C02F 2209/22; C02F 2209/44; C02F 2305/06; B01D 9/0036; B01D 9/0059; C01B 25/375; Y02W 10/10

USPC ....... 210/605, 610, 614, 615, 616, 617, 631, 210/906

See application file for complete search history.

(56) References Cited

FOREIGN PATENT DOCUMENTS

| CN | 107311308 A | * | 11/2017 | ............ C02F 31/268 |
| CN | 112645447 A | * | 4/2021 | |
| CN | 112661266 A | * | 4/2021 | ........... C01B 25/375 |
| JP | 05104087 A | * | 4/1993 | |
| JP | 10151490 A | * | 6/1998 | |

OTHER PUBLICATIONS

Machine-generated English translation of CN 107311308, generated on May 13, 2025.*
Machine-generated English translation of CN 112645447, generated on May 13, 2025.*
Machine-generated English translation of CN 112661266, generated on May 13, 2025.*
Machine-generated English translation of JP 05104087, generated on May 13, 2025.*
Machine-generated English translation of JP 10151490, generated on May 13, 2025.*
Machine-generated English translation of CN 106745740, generated on May 13, 2025.*

* cited by examiner

PROCESS FOR ENRICHING PHOSPHORUS AND RECOVERING BLUE IRON ORE BY USING BIOFILM METHOD

TECHNICAL FIELD

The present invention relates to the technical field of water treatment, and in particular, to a process for enriching phosphorus and recovering vivianite by a biofilm method.

BACKGROUND

Phosphorus flows in one way in the nature, so it has dual characteristics of scarcity and pollution. Based on the current storage and use rate of phosphorus, it is forecasted that the world's phosphorus storage is only available for human use for another 100 years. The phosphorus in municipal wastewater treatment plants will become the main source of phosphorus resource recovery in the future.

The Enhanced Biological Phosphorus Removal (EBPR) process used in existing municipal sewage plants mainly removes phosphorus from sewage by discharging excess sludge. The EBPR process has problems such as low recovery efficiency and relatively high cost.

Organisms on biofilms have the characteristics of long generation time and large biomass. Biofilm methods have the advantages of high efficiency and low operating cost. Existing studies have shown that the biofilm methods used to recover phosphorus have the potential of achieving high phosphorus enrichment in mainstream processes. At present, several mainstream biofilm methods consume a lot of carbon sources (concentration ranging from 500-2000 mg/L based on sodium acetate) in order to increase the concentration of phosphorus enrichment. Even so, the enriched phosphorus still has relatively low concentration, and the highest phosphorus concentration can only reach about 150 mg/L. Therefore, the demand for high enrichment of phosphorus still has a large enhanced space.

The enriched phosphorus is recovered in the form of phosphorus recovery products, and the phosphorus recovery rate is an important indicator of the phosphorus recovery process. The phosphorus recovery rate=(phosphorus concentration of recovered solution*volume of a recovery tank)/(phosphorus concentration of aerobic influent*volume of aerobic influent)*100%). At present, the phosphorus recovery products are mainly struvite and calcium phosphate. The struvite method has the defects of complicated operation process, harsh reaction conditions, a need to add a magnesium source, relatively high cost and unsatisfactory recovery effect, with a phosphorus recovery rate of only 10% to 50%. The calcium phosphate method has the defects of binding with other organic matters or metals, difficult separation and purification, inapplicability in sewage plants that use aluminum salts as flocculants, etc.

Vivianite ($Fe_3(PO_4)_2 \cdot 8H_2O$) is a very stable ferro-phosphorus compound, and is valuable in phosphorus (P) per unit weight. In addition, the vivianite with relatively high purity can be used for the synthesis of a high energy density energy storage material—lithium iron phosphate, and is one of the main synthetic raw materials for power lithium-ion batteries. The large-particle high-purity vivianite crystal itself also has relatively high collection value. The vivianite is stable in nature, but can be slowly oxidized under an aerobic condition. Vivianite sludge was also found in the sludge of sewage treatment plants using iron coagulants. If the vivianite can be effectively recovered, it will have relatively high economic value.

In view of this, it is necessary to solve the above problems of low phosphorus enrichment concentration, high carbon source consumption, low phosphorus enrichment and recovery efficiency, low economic value of recovery products after enrichment, etc. in the prior art.

SUMMARY

The present invention aims to disclose a process for enriching phosphorus and recovering vivianite by a biofilm method, which solves the problems of low efficiency of phosphorus removal from sewage, high carbon source consumption and low economic value of recovery products.

To achieve the above objective, the present invention provide a process for enriching phosphorus and recovering vivianite by a biofilm method, specifically comprising the following steps:

1) an aerobic phosphorus absorption stage: under an aerobic condition, controlling dissolved oxygen of phosphorus-containing wastewater in a biofilm reactor to be greater than 4 mg/L, and discharging the wastewater after aerobic phosphorus absorption for a period of hydraulic retention time;

2) an anaerobic phosphorus release stage: under an anaerobic condition, feeding liquid in a phosphorus recovery device into the biofilm reactor as base liquid, adding a carbon source at a preset carbon-phosphorus ratio through a carbon source dosing device, and discharging the phosphorus-containing solution to the phosphorus recovery device after anaerobic phosphorus release for another period of hydraulic retention time;

3) a cyclic enrichment stage: performing multiple rounds of operation, each round comprising one cycle of the aerobic phosphorus absorption phase according to step 1) and one cycle of the anaerobic phosphorus release phase according to step 2) so that the base liquid reaches a phosphorous-rich solution with a preset concentration, and recovering the phosphorous-rich solution to the phosphorus recovery device;

4) a seed crystal forming stage: further discharging the phosphorus-rich solution in the phosphorus recovery device to an up-flow reactor, adding a ferrous ion solution to the up-flow reactor, and continuously operating a backflow system to fully mix the ferrous ion solution and the phosphorus-rich solution in the up-flow reactor to form ferrous phosphate seed crystals; and 5) a crystal forming stage: continuously feeding the phosphorus-rich solution and the ferrous ion solution into the up-flow reactor at a preset speed, and continuously operating the backflow system to circularly crystallize the phosphorus-rich solution and the ferrous ion solution in the up-flow reactor, so that the ferrous phosphate seed crystals form ferrous phosphate crystals with a preset particle size.

As a further improvement of the present invention, in step 1), the period of hydraulic retention time at the aerobic phosphorus absorption stage is from 2 to 10 hours; and in step 2), the period of hydraulic retention time at the anaerobic phosphorus release stage is from 1 to 6 hours.

As a further improvement of the present invention, in step 1), the dissolved oxygen in the biofilm reactor ranges from 4 mg/L to 8 mg/L, and after the aerobic phosphorus absorption, the phosphorus storage capacity of a phosphorus-accumulating biofilm in the biofilm reactor is greater than or equal to 100 mg-P/g-SS(mixed liquor suspended solids).

As a further improvement of the present invention, an enrichment time of the phosphorus-rich solution in step 3) is 10 to 30 times.

As a further improvement of the present invention, the preset carbon-phosphorus ratio in step 2) is 15 g/g to 40 g/g, and the concentration of the phosphorus-rich solution obtained in step 3) is 60 mg/L to 300 mg/L.

As a further improvement of the present invention, step 3) further comprises storing the phosphorus-rich solution in the phosphorus recovery device to a phosphorus storage device under the anaerobic condition, and step 4) further comprises discharging the phosphorus-rich solution from the phosphorus storage device to the up-flow reactor.

As a further improvement of the present invention, oxidation-reduction potentials in the phosphorus recovery device and the phosphorus storage device range from −450 mv to −100 mv.

As a further improvement of the present invention, the ferrous ion solution is a ferrous sulfate solution or a ferrous chloride tetrahydrate solution.

As a further improvement of the present invention, in step 5), the up-flow reactor further comprises an overflow weir at the upper end of the up-flow reactor, and wastewater produced in the up-flow reactor is discharged from the overflow weir.

As a further improvement of the present invention, in step 5), the ferrous phosphate crystals have an average particle size greater than or equal to 100 μm.

Compared with the prior art, the beneficial effects of the present invention are:

The process for enriching phosphorus and recovering vivianite by a biofilm method according to the present invention removes and recovers phosphorus from municipal sewage, enriches phosphorus by the biofilm method, and uses vivianite as a recovery product to recover the phosphorus; in addition, by preparing high dissolved oxygen in the biofilm reactor at the aerobic stage, a high-concentration phosphorus recovery solution can be obtained with a relatively low carbon-phosphorus ratio and relatively high enrichment times, that is, the consumption of carbon sources is reduced by strengthening phosphorus storage; moreover, since the oxidation-reduction potential is controlled to be less than −100 mv by the biofilm method at the anaerobic phosphorus release stage, the oxidation-reduction potential does not need to be adjusted again during the recovery of vivianite, which is not only beneficial to the crystal purity of vivianite, but also improves the overall process efficiency. The recovery of phosphorus by this process not only solves the problem of phosphorus removal from municipal sewage, but also obtains vivianite as a recovery product, which greatly improves the economic value.

Figure 1:
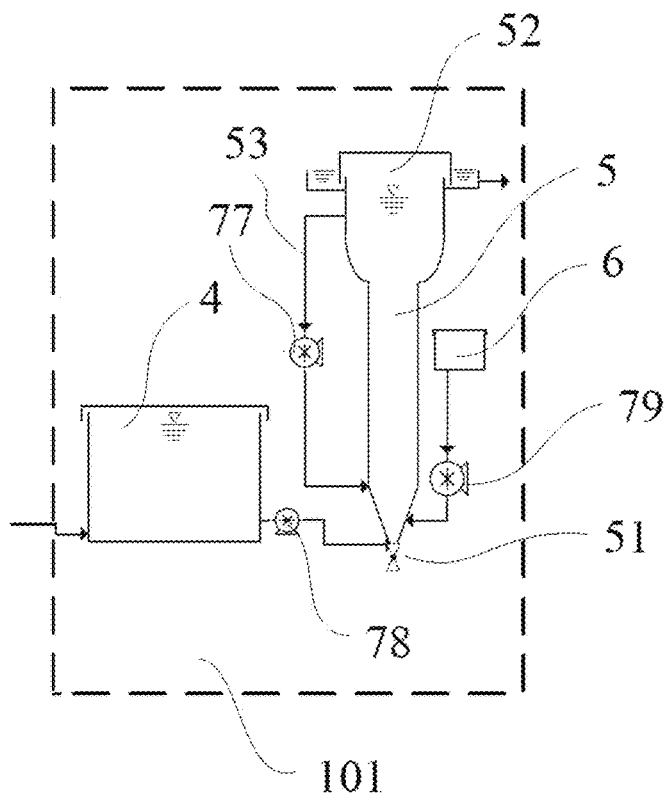
FIG. 1 is a schematic flow diagram of a vivianite recovery system according to the present invention.

Reference numerals: 101, 101'—vivianite recovery system, 102, 102'—biofilm phosphorus enrichment system, 1, 1'—carbon source dosing device, 2, A1, A2—biofilm reactor, 21—aeration device, 22—mixer, 3—phosphorus recovery device, 4—phosphorus storage device, 5, 5'—up-flow reactor, 51—discharge structure, 51'—valve, 52, 52'—overflow weir, 53—backflow system, 6—dosing device, 71—valve, 72, 73, 74, 75, 76, 77, 78, 79—pump, 701', 702', 713', 714', 716', 717', 718', 719'—pump, 703', 705', 706', 707', 708', 709', 710', 711', 712', 715'—valve, 3'—phosphorus recovery tank, 4'—phosphorus storage tank.

DETAILED DESCRIPTION OF THE EMBODIMENTS

The present invention will be described in detail below in conjunction with the embodiments shown in the accompanying drawings, but it should be noted that these embodiments do not limit the present invention, and equivalent variations or substitutions on functions, methods, or structures made by those of ordinary skill in the art according to these embodiments shall fall within the protection scope of the present invention.

As shown in FIG. 1, the present invention provides a vivianite recovery system 101, including an up-flow reactor 5, and a phosphorus storage device 4 and an dosing device 6 that are communicated with the up-flow reactor 5. The up-flow reactor 5 is provided with a backflow system 53 and a discharge structure 51. The phosphorus storage device 4 and the dosing device 6 are respectively communicated with the up-flow reactor 5, the up-flow reactor 5 is provided with a phosphorus-rich solution (with a phosphorus concentration of 60 mg/L to 300 mg/L) by the phosphorus storage device 4, a ferrous ion solution is added to the up-flow reactor 5 by the dosing device 6, the backflow system 53 assists in the formation of ferrous phosphate crystals in the up-flow reactor 5, and the ferrous phosphate crystals are discharged by the discharge structure 51.

In an embodiment, the phosphorus storage device 4 is communicated with the up-flow reactor 5 by a pipe and a pump 78, and the dosing device 6 is communicated with the up-flow reactor 5 by a pipe and a pump 79. The backflow system 53 is connected to a water outlet at the upper part of the up-flow reactor 5 and a water inlet at the lower part of the up-flow reactor 5 by pipes, and a pump 77 is connected to the pipe of the backflow system 53.

In an embodiment, the discharge structure 51 includes a discharge port (not shown) and a valve (not shown) at the bottom end of the up-flow reactor 5. The ferrous phosphate crystals formed in the up-flow reactor 5 are discharged through the discharge port. The up-flow reactor 5 further includes an overflow weir 52 at the upper end of the up-flow reactor 5, and wastewater produced in the up-flow reactor 5 is discharged out from the overflow weir 52.

In an embodiment, the ferrous ion solution added by the dosing device 6 is a ferrous sulfate solution or a ferrous chloride tetrahydrate solution.

In an embodiment, the oxidation-reduction potential in the phosphorus storage device 4 is less than −100 mv, and the ferrous phosphate crystals formed in the up-flow reactor 5 have an average particle size greater than or equal to 100 μm.

Figure 2:
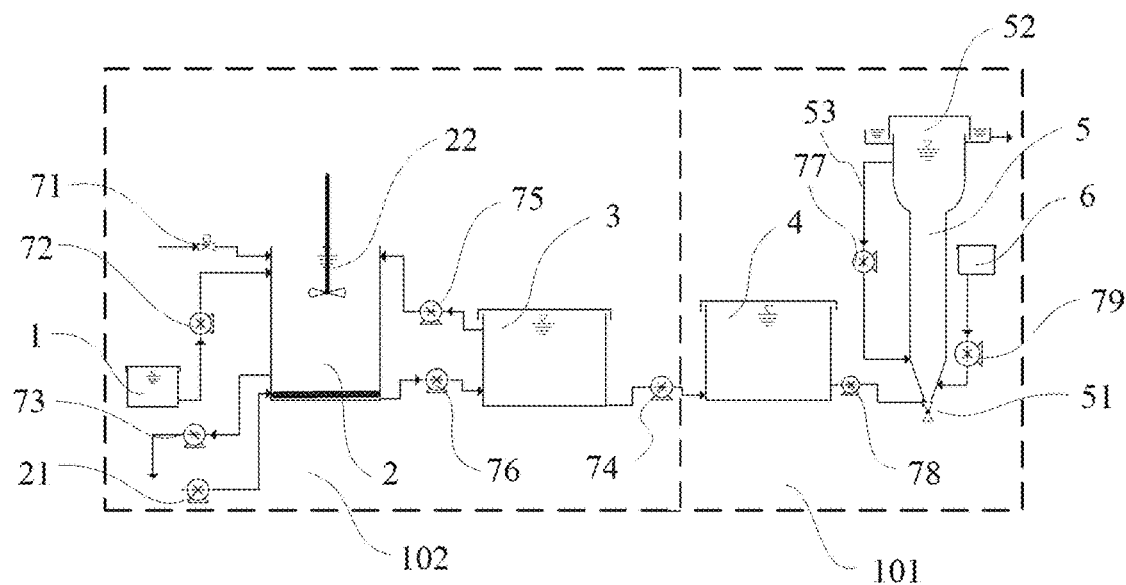
FIG. 2 is a schematic flow diagram of a process for enriching phosphorus and recovering vivianite by a biofilm method according to the present invention.

As shown in FIG. 2, the present invention provides a system for enriching phosphorus and recovering vivianite by a biofilm method, including a biofilm phosphorus enrichment system 102 and a vivianite recovery system 101. The biofilm phosphorus enrichment system 101 is communicated with the phosphorus storage device 4. Specifically, the biofilm phosphorus enrichment system 102 includes a biofilm reactor 2, and a carbon source dosing device 1 and a phosphorus recovery device 3 that are communicated with the biofilm reactor 2. The phosphorus recovery device 3 is communicated with the phosphorus storage device 4, and the phosphorus recovery device 3 provides the phosphorus-rich solution for the phosphorus storage device 4.

In an embodiment, the biofilm reactor 2 is a sequencing batch biofilm reactor, an anaerobic-aerobic biofilter or a trickling filter.

In an embodiment, the carbon source added by the carbon source dosing device 1 is sodium acetate, sodium propionate, glucose, or supernatant of concentration or fermentation of sludge from municipal sewage plants.

In an embodiment, the biofilm reactor 2 is composed of an aeration device 21 and a mixer 22. The carbon source dosing device 1 is communicated with the biofilm reactor 2 by a pipe and a pump 72. A controllable circulation system is formed between the phosphorus recovery device 3 and the biofilm reactor 2 through a pipe, a pump 75, and a pump 76.

In combination with the process flow diagram shown in FIG. 2, the present invention provides a process for enriching phosphorus and recovering vivianite by a biofilm method.

The biofilm phosphorus enrichment system 102 is mainly composed of the carbon source dosing device 1, the biofilm reactor 2 and the phosphorus recovery device 3. The vivianite recovery system 101 is mainly composed of the up-flow reactor 5, the phosphorus storage device 4 and the dosing device 6 that operate continuously. The two systems are connected by the phosphorus storage device 4 for water volume adjustment.

Municipal sewage is fed into the biofilm reactor 2 from a valve 71. When the sewage fills an effective volume, the valve 71 is closed, the aeration device 21 is opened, and the pumps 72, 73, 75, and 76 are closed to keep the interior of the biofilm reactor 2 in an aerobic state and control dissolved oxygen to be greater than or equal to 4 mg/L. At this time, a polyphosphate biofilm absorbs phosphorus from wastewater to remove phosphorus therein, and a high phosphorus storage capacity (>100 mg-P/g-SS) is obtained by increasing the dissolved oxygen. The high phosphorus storage capacity becomes one of the phosphorus release powers of phosphorus-accumulating bacteria, so that a phosphorus-rich solution (with a phosphorus concentration of 60 to 300 mg/L) is obtained under a low carbon source concentration (phosphorus absorption COD per recovery unit (Prel/Cupt) is 6), wherein an enrichment time of the phosphorus-rich solution can reach 10 to 30 times. After 2 to 10 hours, the aeration device 21 is closed and the pump 73 is opened to discharge the treated wastewater up to standard. The pump 73 and the aeration device 21 are closed, and the sewage in the phosphorus recovery tank 3 is lifted into the biofilm reactor 2 through the pump 75. After the sewage fills an effective volume, the pump 76 is closed, the mixer 22 and the pump 72 are closed, and a carbon source is added at a carbon-phosphorus ratio of 15 to 40. At this time, the biofilm reactor 2 is at an anaerobic stage, and the phosphorus-accumulating bacteria in the biofilm release the phosphorus enriched in vivo into the solution by means of the carbon source in the solution. After 1 to 6 hours, the mixer 22 is closed and the pump 76 is opened to discharge the phosphorus-containing solution into the phosphorus recovery device 4. The biofilm completes a batch of phosphorus removal and enrichment. The phosphorus-containing solution in the phosphorus recovery device 4 is recycled at the anaerobic stage. After the phosphorus concentration in the recovery tank is greater than or equal to 60 mg/L by multiple batches of cycles, a phosphorus-rich solution is formed and fed into the vivianite recovery system 101.

In this embodiment, the carbon-phosphorus ratio is preferably 15 to 40. The phosphorus storage is strengthened by the high dissolved oxygen prepared at the aerobic stage, so that a high-concentration phosphorus recovery solution can be obtained under relatively low carbon-phosphorus ratio conditions with relatively high enrichment times.

In an embodiment, the phosphorous-containing wastewater has a phosphate concentration of 8±0.18 mg/L. The wastewater is fed into the biofilm reactor 2 from the valve 71. After the wastewater fills an effective volume, the valve 71 is closed, the aeration device 21 is opened, and the pumps 72, 73, 75, and 76 are closed to keep the interior of the biofilm reactor 2 in an aerobic state and control dissolved oxygen to be 4 mg/L. After 4 hours, the aeration device 21 is closed and the pump 73 is opened to discharge the treated wastewater up to standard, wherein the total dissolved phosphorus removal rate is 94%. The pump 73 and the aeration device 21 are closed, and the sewage in the phosphorus recovery tank 3 is lifted into the biofilm reactor 2 through the pump 75. After the sewage fills an effective volume, the pump 76 is closed, the mixer 22 and the pump 72 are closed, and sodium acetate is added at a carbon-phosphorus ratio of 25 g/g. At this time, the biofilm reactor 2 is at an anaerobic stage. After 2 hours, the mixer 22 is closed and the pump 76 is opened to discharge the phosphorus-containing solution into the phosphorus recovery device 3. The biofilm completes a batch of phosphorus removal and enrichment. The phosphorus-containing solution in the phosphorus recovery device 4 is recycled at the anaerobic stage. After multiple batches of cycles, the phosphorus concentration in the recovery tank reaches 222.25±10.09 mg/L, and a phosphorus-rich solution is formed. The phosphorus recovery rate is 80.96%, and the carbon source consumption is 41.57±1.89 g-COD/g-P.

TABLE 1

Data comparison between process parameters of the present invention and better process parameters disclosed in the prior art

| Comparative item | Phosphorus concentration of aerobic influent (mg/L) | HRT Aerobic time | HRT Anaerobic time | Total dissolved phosphorus removal (%) | Phosphorus recovery rate (%) | Concentration of phosphorus rich solution (P mg/L) | Enrichment times | Carbon source consumption[b] (g-COD/g-P) | Carbon-phosphorus ratio |
|---|---|---|---|---|---|---|---|---|---|
| The present invention | 8 ± 0.18 mg/L | 4 h | 2 h | 94 | 80.96 | 222.5 (±10.09) | 27.8 | 41.57 (±1.89) | 25 |

TABLE 1-continued

Data comparison between process parameters of the present invention and better process parameters disclosed in the prior art

| Comparative item | Phosphorus concentration of aerobic influent (mg/L) | Aerobic time | Anaerobic time | Total dissolved phosphorus removal (%) | Phosphorus recovery rate (%) | Concentration of phosphorus rich solution (P mg/L) | Enrichment times | Carbon source consumption[b] (g-COD/g-P) | Carbon-phosphorus ratio |
|---|---|---|---|---|---|---|---|---|---|
| Tian et al., 2016 | 16 mg/L | 5 h | 3 h + 3 – 9 h (10th) | — | 48/39.2 (calculated value) | 133 | 8.3 | 327.42 | 68.32 |
| Wong et al., 2013 | 8 mg/L | 4 h | 2 h | 85 | 31.25 (calculated value) | 100 | 12.5 | 40.0 | 50 |

With reference to Table 1, the process parameters in an embodiment of the present invention are compared with the parameters described in two existing publications. Through the process of the present invention, the highest concentration of the recovered phosphorus-rich solution reaches 232.59 mg/L; the phosphorus recovery rate reaches 80.96%, which is much higher than existing reports at home and abroad; and the enrichment times reach 27.8 times, which is also higher than the existing reports. The calculation and evaluation of the carbon source consumption in the actual operation of the process show that (carbon source consumption=total carbon source added within a recycling period/final phosphorus content of recovered solution), the carbon source consumption of the system drops to 41.57 g-COD/gP, which is at a relatively low level compared with other existing studies. In this embodiment, the carbon-phosphorus ratio of the present invention is 25, which is far lower than the other two comparative items, while the enrichment times and phosphorus concentration are much higher than the other comparative items. The biofilm phosphorus enrichment system 102 of the present invention can obtain a high-concentration phosphorus recovery solution with a relatively low carbon-phosphorus ratio and relatively high enrichment times, which greatly reduces the process cost and improves the process efficiency. Among the comparative items, Tian et al., 2016 is derived from chemosphere 144 (2016) 1797-1806, and Wong et al., 2013 is derived from water research 47 (2013) 2025-2032.

In the up-flow reactor 5, the oxidation-reduction potential (ORP) is less than −100 mv, which is beneficial to the crystallization of ferrous phosphate and can improve the purity of ferrous phosphate crystals. At the anaerobic phosphorus absorption stage, the ORP in the biofilm reactor 2 is less than −100 mv, the phosphorus-rich solution formed is stored in the sealed phosphorus recovery tank 3, and the ORP in the phosphorus recovery tank 3 is less than −100 mv. The phosphorus-rich solution in the phosphorus recovery device 3 is lifted from the bottom by the pump 74 into the phosphorus storage device 4 under an anaerobic condition. The ORP in the phosphorus storage device 4 is also less than −100 mv. As such, additional anaerobic treatment is not required for the up-flow reactor 5, which improves the overall process efficiency.

In an embodiment, the oxidation-reduction potentials in the phosphorus recovery device 3 and the phosphorus storage device 4 range from −450 mv to −100 mv. This range is helpful to generating high-purity ferrous phosphate crystals.

The phosphorus-rich solution in the phosphorus storage device 4 is pumped into the vivianite recovery system 101 by the pump 78. The vivianite recovery system 101 operates continuously. At the seed crystal forming stage, the phosphorus-containing solution in the phosphorus storage device 4 is pumped into the up-flow reactor 5 by the pump 78, and the pump 79 is opened to add a ferrous sulfate solution at a certain iron-phosphorus ratio. After the up-flow reactor 5 is full, the pumping is stopped, and the pump 77 is opened to mix the solution thoroughly in the up-flow reactor 5 and form ferrous phosphate seed crystals. In an embodiment, the ferrous sulfate is added at a molar ratio of ferrous ion to phosphate ion concentration of (1.5-3):1.

At the seed crystal growth stage, the phosphorus-containing solution in the phosphorus storage device 4 is continuously pumped into the up-flow reactor by the pump 77 to realize continuous operation, and the pump 78 is opened to realize cyclic crystallization of the phosphorus-containing solution and the ferrous sulfate solution in the up-flow reactor 5. After the ferrous phosphate crystals have an average particle size greater than or equal to 100 μm, the valve of the discharge port 51 is opened to discharge the ferrous phosphate crystals. At the seed crystal growth stage, the wastewater is continuously discharged through the overflow weir 52.

In an embodiment, the phosphorus-rich solution recovered by using the biofilm phosphorus enrichment system 102 has a total phosphorus concentration of 70 mg/L, and is stored in the phosphorus storage device 4, and vivianite is further recovered therefrom through the vivianite recovery system 101. First, the phosphorus solution in the phosphorus storage device 4 is fed into the up-flow reactor 5 by the pump 78, and when the liquid level of the phosphorus solution is higher than the highest end face of the backflow device 77, the feeding is stopped. In this embodiment, the feeding volume of the phosphorus solution is 3 L. Then the pump 79 is opened, and 35 ml of ferrous sulfate solution with a ferrous ion concentration of 40 g/L is added to the up-flow reactor 1, wherein the molar ratio of added ferrous ions to phosphate ions is 2:1. In addition, the pH value in the up-flow reactor 1 is controlled to be 7 to 7.5 by adding NaOH or HCL, and the oxidation-reduction potential (ORP) in the up-flow reactor 5 is controlled to be −450 mv to −100 mv through the monitoring of a monitoring device; then, the up-flow reactor 5 is formed into a closed circulating flow system at an ascending flow rate of 0.5 m/h through the backflow device 53; after 0.5 h of hydraulic retention and 0.5 h of precipitation, the ferrous sulfate solution and the phosphorus solution are mixed thoroughly to form ferrous phosphate seed crystals, and the wastewater is discharged through the overflow weir 52; the phosphorus solution and the ferrous sulfate solution are fed multiple times for multiple cycles, the ferrous sulfate solution and the phosphorus solution are cyclically crystallized in the up-flow reactor 5, further crystallization is implemented based on the ferrous phosphate seed crystals as a matrix to form ferrous phosphate crystals with increasingly large particle sizes; when the hydraulic residence time in the up-flow reactor 5 is 8 h, the reaction is stopped; after 4 h of precipitation, ferrous phosphate crystals with a particle size of 180 μm and a purity of 88.23% are obtained; and finally, the valve of the discharge port 51 is opened to discharge the ferrous phosphate crystals.

The process for enriching phosphorus and recovering vivianite by a biofilm according to the present invention removes and recovers phosphorus from municipal sewage, enriches phosphorus by a biofilm method, and recovers the phosphorus with vivianite as a recovery product. At the aerobic phosphorus absorption stage, the phosphorus storage of the polyphosphate biofilm is strengthened by increasing the concentration of dissolved oxygen and extending the hydraulic retention time, thereby reducing the consumption of carbon sources, improving the efficiency of phosphorus enrichment, and saving the process cost. In addition, since the oxidation-reduction potential is controlled to be less than −100 mv by the biofilm method at the anaerobic phosphorus release stage, the oxidation-reduction potential does not need to be adjusted again during the recovery of vivianite, which is not only beneficial to the crystal purity of vivianite, but also improves the overall process efficiency.

Figure 3:
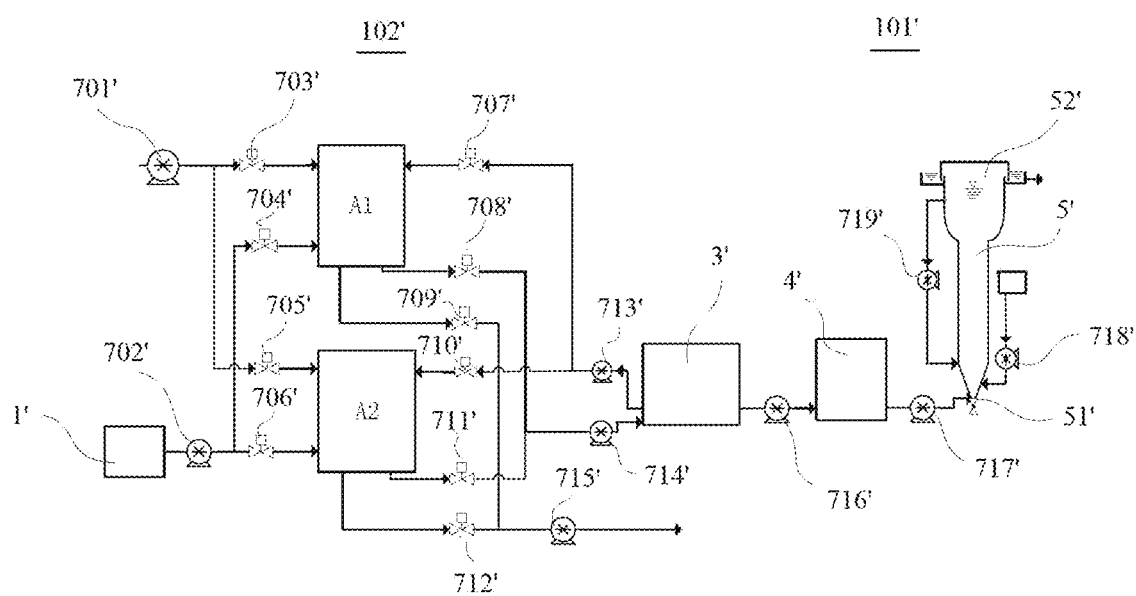
FIG. 3 is a schematic flow diagram of a process for enriching phosphorus and recovering vivianite by using two sets of parallel biofilms.

As shown in FIG. 3, an embodiment of the present invention further provides a process for enriching phosphorus and recovering vivianite by a biofilm. Multiple sets of biofilm phosphorus enrichment systems 102' are included. This embodiment takes two sets of parallel biofilm phosphorus enrichment systems as an example.

After municipal sewage enters the biofilm reactor A1 through the pump 701' and the valve 703', the aeration device (not shown) is opened, the biofilm reactor A1 is in an aerobic state, dissolved oxygen is controlled to be greater than 4 mg/L, and phosphorus-accumulating bacteria on the biofilm absorb phosphorus in the wastewater to reduce the phosphorus concentration therein; at the same time, the phosphorus-containing solution in the phosphorus recovery tank 3' enters the biofilm reactor A2 through the pump 713' and the valve 710', the pump 702' and the valve 706' are opened to add the carbon source in the carbon source dosing device 1', the biochemical oxygen demand of the solution in the biofilm reactor A2 is controlled to be 200 mg/L, the mixer is started, the phosphorus-accumulating bacteria in the biofilm reactor A2 releases the phosphorus absorbed in vivo by means of the carbon source in the water, and the valve 709' and the pump 715' are opened after 4 to 8 hours to discharge the wastewater treated in the biofilm reactor A1; meanwhile, the valve 711' and the pump 714' are opened to lift the phosphorus-rich solution produced in the biofilm reactor A2 into the phosphorus recovery tank 3'.

After municipal sewage enters the biofilm reactor A2 through the pump 701' and the valve 705', the aeration device is opened, the biofilm reactor A2 is in an aerobic state, dissolved oxygen is controlled to be greater than 3 mg/L, and phosphorus-accumulating bacteria on the biofilm absorb phosphorus in the wastewater to reduce the phosphorus concentration therein; at the same time, the phosphorus-rich solution in the phosphorus recovery tank 3' enters the biofilm reactor A1 through the pump 713' and the valve 707', the pump 702' and the valve 704' are opened to add the carbon source in the carbon source dosing device 1' into the biofilm reactor A1 at a carbon-phosphorus ratio of 15 to 40, the mixer is started, the phosphorus-accumulating bacteria in the biofilm reactor A1 releases the phosphorus absorbed in vivo by means of the carbon source in the water, and the valve 712' and the pump 715' are opened after 4 to 8 hours to discharge the wastewater treated in the biofilm reactor A2; meanwhile, the valve 708' and the pump 714' are opened to pump the phosphorus-rich solution in the biofilm reactor A1 into the phosphorus recovery tank 3', so that the phosphorus concentration in the phosphorus recovery tank 3' rises and reaches a recovery condition.

After the phosphorus concentration in the phosphorus recovery tank 3' reaches 60 to 300 mg/L, a phosphorus-rich solution is formed. The phosphorus-rich solution in the phosphorus recovery tank 3' is lifted into the phosphorus storage tank 4' by the pump 716' under an anaerobic condition. The oxidation-reduction potential of the phosphorus storage tank 4' is −100 mv, which is beneficial to the crystallization of vivianite.

The phosphorus-rich solution in the phosphorus storage tank 4' is lifted into the vivianite recovery system 101' by the pump 717'. The vivianite recovery system 101' operates continuously, and the operation in the up-flow reactor 5' is divided into a seed crystal forming stage and a seed crystal growth stage. At the seed crystal forming stage, the phosphorus-rich solution is pumped into the up-flow reactor 5' by the pump 717', and the pump 718' is opened to pump a ferrous sulfate solution at a certain iron-phosphorus ratio. After the up-flow reactor 5' is full, the pumping is stopped, and the pump 719' is opened so that the solution is mixed thoroughly in the up-flow reactor 5' and forms ferrous phosphate seed crystals.

At the seed crystal growth stage, the phosphorus-rich solution in the phosphorus storage tank 4' is continuously lifted into the up-flow reactor 5' by the pump 717' to realize continuous operation, and the pump 719' is opened to realize cyclic crystallization of the phosphorus-rich solution and the ferrous sulfate solution in the up-flow reactor 5'. After the vivianite crystals have an average particle size greater than or equal to 100 μm, the valve 51' is opened to discharge the ferrous phosphate crystals. At the seed crystal growth stage, the wastewater is continuously discharged through the overflow weir 52'.

The process provided by the embodiments of the present invention can remove and enrich phosphorus and synchronously recover vivianite, and can also select different numbers of biofilm phosphorus enrichment systems according to the time of a reaction period, so that the entire system becomes a continuous flow.

The process for enriching phosphorus and recovering vivianite by a biofilm method according to the present invention can obtain a high phosphorus storage capacity by increasing the dissolved oxygen in the biofilm reactor, thereby obtaining a high-concentration phosphorus recovery solution at a low carbon source concentration, reducing the process cost, and improving the process efficiency. The phosphorus enrichment concentration studied by the existing biofilm method can reach a maximum of about 150 mg/L, while the phosphorus-rich solution enriched by the process of the present invention can reach a maximum of 220 mg/L; the phosphorus recovery rate in the existing process is less than 50%, while the phosphorus recovery rate through the process of the present invention can reach 80% or more. In addition, the process of the present invention can also maintain relatively low carbon source consumption while obtaining the high-concentration phosphorus-rich solution and reaching the phosphorus recovery rate of 80% or more, and 30-40 g of carbon source (based on sodium acetate) is consumed to recover 1 g of phosphorus, which is far lower than the existing carbon source dosing level. While phosphorus is removed and enriched, the phosphorus product is recovered in the form of vivianite, which has wide applicability and relatively high economic value.

A series of detailed descriptions set forth above are merely specific descriptions directed to the feasible embodiments of the present invention, and they are not intended to limit the scope of protection of the present invention. Any equivalent embodiment or alteration made without departing from the spirit of the present invention shall fall within the protection scope of the present invention.

It is obvious to those skilled in the art that the present invention is not limited to the details of the above exemplary embodiments, and the present invention can be implemented in other specific forms without departing from the spirit or essential characteristics of the present invention. Therefore, the embodiments are considered as illustrative but not restrictive at any point, and the scope of the present invention is defined by the appended claims instead of the above description. Accordingly, all variations intended to fall within the meaning and scope of equivalent elements of the claims are included in the present invention. Any reference signs in the claims should not be construed as limiting the claims.

In addition, it should be understood that, although this specification is described according to the embodiments, but not every embodiment includes only one independent technical solution. The description of the specification is only for the sake of clarity, a person skilled in the art should regard the specification as a whole. The technical solutions in the embodiments can be properly combined to form other embodiments that can be understood by the person skilled in the art.

What is claimed is:

1. A process for enriching phosphorus and recovering vivianite by a biofilm method, specifically comprising the following steps:
    1) an aerobic phosphorus absorption stage: under an aerobic condition, controlling dissolved oxygen of phosphorus-containing wastewater in a biofilm reactor to be greater than 4 mg/L, and discharging the wastewater after aerobic phosphorus absorption for a period of hydraulic retention time;
    2) an anaerobic phosphorus release stage: under an anaerobic condition, feeding liquid in a phosphorus recovery device into the biofilm reactor as base liquid, adding a carbon source at a preset carbon-phosphorus ratio through a carbon source dosing device, and discharging the phosphorus-containing solution to the phosphorus recovery device after anaerobic phosphorus release for another period of hydraulic retention time;
    3) a cyclic enrichment stage: performing multiple rounds of operation, each round comprising one cycle of the aerobic phosphorus absorption phase according to step 1) and one cycle of the anaerobic phosphorus release phase according to step 2) so that the base liquid reaches a phosphorous-rich solution with a preset concentration, and recovering the phosphorous-rich solution to the phosphorus recovery device;
    4) a seed crystal forming stage: further discharging the phosphorus-rich solution in the phosphorus recovery device to an up-flow reactor, adding a ferrous ion solution to the up-flow reactor, and continuously operating a backflow system to fully mix the ferrous ion solution and the phosphorus-rich solution in the up-flow reactor to form ferrous phosphate seed crystals; and
    5) a crystal forming stage: continuously feeding the phosphorus-rich solution and the ferrous ion solution into the up-flow reactor at a preset speed, and continuously operating the backflow system to circularly crystallize the phosphorus-rich solution and the ferrous ion solution in the up-flow reactor, so that the ferrous phosphate seed crystals form ferrous phosphate crystals with a preset particle size.

2. The process for enriching phosphorus and recovering vivianite by a biofilm method according to claim 1, wherein in step 1), the period of hydraulic retention time at the aerobic phosphorus absorption stage is from 2 to 10 hours; and in step 2), the period of hydraulic retention time at the anaerobic phosphorus release stage is from 1 to 6 hours.

3. The process for enriching phosphorus and recovering vivianite by a biofilm method according to claim 1, wherein in step 1), the dissolved oxygen in the biofilm reactor ranges from 4 mg/L to 8 mg/L, and after the aerobic phosphorus absorption, the phosphorus storage capacity of a phosphorus-accumulating biofilm in the biofilm reactor is greater than or equal to 100 mg-P/g-SS.

4. The process for enriching phosphorus and recovering vivianite by a biofilm method according to claim 1, wherein an enrichment time of the phosphorus-rich solution in step 3) is 10 to 30 times.

5. The process for enriching phosphorus and recovering vivianite by a biofilm method according to claim 1, wherein the preset carbon-phosphorus ratio in step 2) is 15 g/g to 40 g/g, and the concentration of the phosphorus-rich solution obtained in step 3) is 60 mg/L to 300 mg/L.

6. The process for enriching phosphorus and recovering vivianite by a biofilm method according to claim 1, wherein step 3) further comprises storing the phosphorus-rich solution in the phosphorus recovery device to a phosphorus storage device under the anaerobic condition, and step 4) further comprises discharging the phosphorus-rich solution from the phosphorus storage device to the up-flow reactor.

7. The process for enriching phosphorus and recovering vivianite by a biofilm method according to claim 6, wherein oxidation-reduction potentials in the phosphorus recovery device and the phosphorus storage device range from −450 mv to −100 mv.

8. The process for enriching phosphorus and recovering vivianite by a biofilm method according to claim 1, wherein the ferrous ion solution is a ferrous sulfate solution or a ferrous chloride tetrahydrate solution.

9. The process for enriching phosphorus and recovering vivianite by a biofilm method according to claim 1, wherein in step 5), the up-flow reactor further comprises an overflow weir at the upper end of the up-flow reactor, and wastewater produced in the up-flow reactor is discharged from the overflow weir.

10. The process for enriching phosphorus and recovering vivianite by a biofilm method according to claim 1, wherein in step 5), the ferrous phosphate crystals have an average particle size greater than or equal to 100 μm.

* * * * *